(12) United States Patent
Yao et al.

(10) Patent No.: US 12,078,782 B2
(45) Date of Patent: Sep. 3, 2024

(54) CAMERA LENS

(71) Applicant: ZHEJIANG SUNNY OPTICS CO., LTD., Zhejiang (CN)

(72) Inventors: Jiacheng Yao, Yuyao (CN); Saifeng Lv, Yuyao (CN); Fujian Dai, Yuyao (CN); Liefeng Zhao, Yuyao (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 220 days.

(21) Appl. No.: 17/509,745

(22) Filed: Oct. 25, 2021

(65) Prior Publication Data
US 2022/0137337 A1    May 5, 2022

(30) Foreign Application Priority Data

Nov. 4, 2020   (CN) .......................... 202011217789.8

(51) Int. Cl.
  *G02B 13/00*    (2006.01)
  *G02B 9/12*    (2006.01)
(52) U.S. Cl.
  CPC ........... *G02B 13/0035* (2013.01); *G02B 9/12* (2013.01); *G02B 13/0055* (2013.01)
(58) Field of Classification Search
  CPC ... G02B 13/0035; G02B 9/12; G02B 13/0055
  USPC ................................................. 359/708, 716
  See application file for complete search history.

(56) References Cited

U.S. PATENT DOCUMENTS

| | | | |
|---|---|---|---|
| 5,606,461 A | * | 2/1997 | Ohshita ................. G02B 13/18 359/716 |
| 9,341,815 B1 | * | 5/2016 | Hsueh .................... H04N 23/54 |

FOREIGN PATENT DOCUMENTS

| | | | | |
|---|---|---|---|---|
| CN | 201993515 U | * | 9/2011 | ......... G02B 13/0035 |
| CN | 105824107 A | * | 8/2016 | |

OTHER PUBLICATIONS

Banks MS, Cooper EA, Piazza EA. Camera Focal Length and the Perception of Pictures. (Year: 2014).*

* cited by examiner

*Primary Examiner* — James R Greece
(74) *Attorney, Agent, or Firm* — Birch, Stewart, Kolasch & Birch, LLP

(57) ABSTRACT

A camera lens is provided, including, in order from an object side to an image side along an optical axis: a first lens having a positive refractive power; a second lens; and a third lens. An equivalent length TL of an actual propagation distance of a principal ray from an object side surface of the first lens to an imaging plane in the air and an entrance pupil diameter EPD of the camera lens satisfy: 3.5<TL/EPD<4.0.

12 Claims, 11 Drawing Sheets

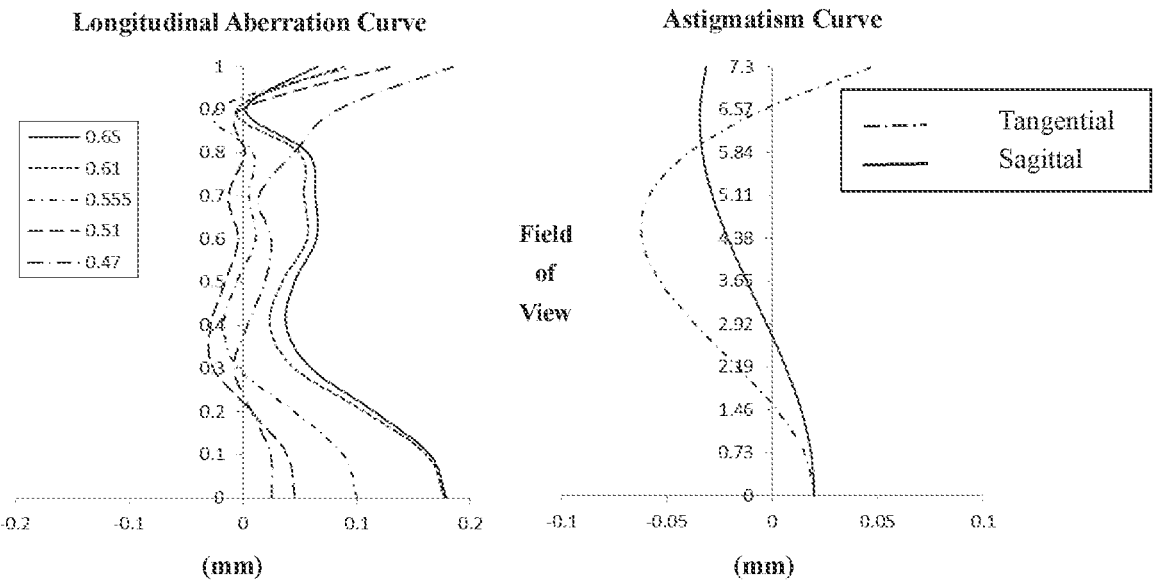
Fig. 15A
Fig. 15B
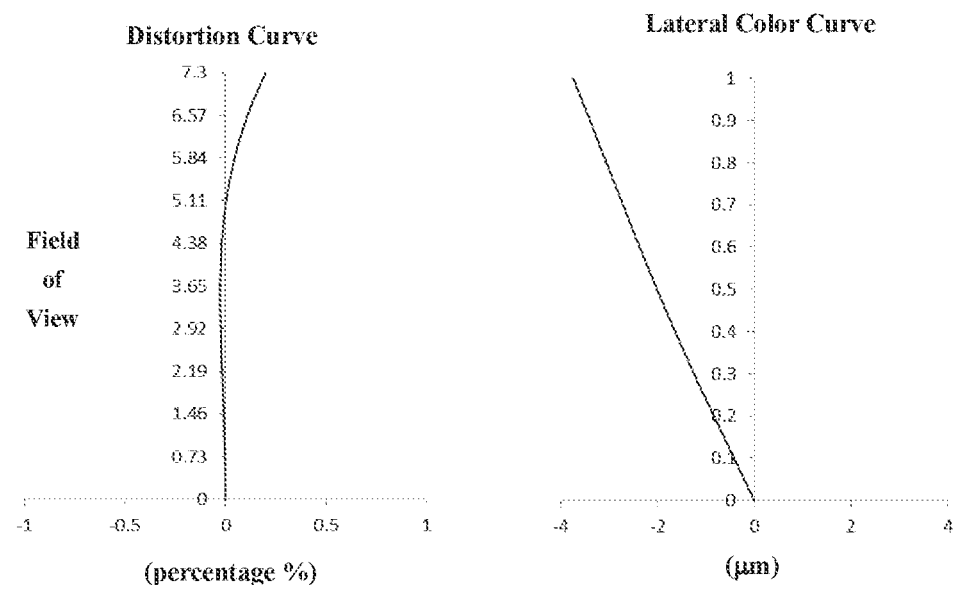
Fig. 15C
Fig. 15D

CAMERA LENS

CROSS-REFERENCE TO RELATED APPLICATIONS

The present application claims the priority of China Patent Application No. 202011217789.8, filed on Nov. 4, 2020, which is hereby incorporated by reference in its entirety.

TECHNICAL FIELD

The present application relates to the field of optical elements, and more specifically, to a camera lens.

BACKGROUND

Consumers have become accustomed to using mobile devices such as mobile phones to capture photos and photography, and have put forward higher and higher requirements for the photo-capturing performance of these devices. Moreover, the performance of camera lenses disposed on mobile phones and other devices has to be continuously improved to adapt to the development of image software functions and video software functions on these devices.

Portable devices such as mobile phones are usually provided with camera modules, so that the mobile phones have a camera function. The camera module is usually provided with a charge-coupled-device (CCD) type image sensor or a complementary-metal-oxide-semiconductor (CMOS) type image sensor, and is provided with a camera lens. The camera lens can collect light from an object side, so that imaging light travels along the optical path of the camera lens and is irradiated onto the image sensor. Then, the image sensor converts optical signals into electrical signals to form image data.

With the advancement of semiconductor manufacturing technology, the pixel size of image sensors keeps decreasing, and at the same time, electronic products such as mobile phones also keep pursuing light weight, small size and good performance. This makes the camera lens have to keep pursuing miniaturization.

There is a need for a miniaturized camera lens that has at least one beneficial effect of good imaging sharpness, telephoto, light weight or the like.

SUMMARY

The present application provides a camera lens, comprising, in order from an object side to an image side along an optical axis: a first lens having a positive refractive power; a second lens; and a third lens; wherein an equivalent length TL of an actual propagation distance of a principal ray from an object side surface of the first lens to an imaging plane in the air and an entrance pupil diameter EPD of the camera lens may satisfy: $3.5 < TL/EPD < 4.0$.

In an implementation, at least one plastic lens is included in the first lens to the third lens.

In an implementation, there is at least one aspherical lens surface from the object side surface of the first lens to an image side surface of the third lens.

In an implementation, a total effective focal length f of the camera lens and a maximum semi-field of view Semi-FOV of the camera lens may satisfy: $f \times \tan(\text{Semi-FOV}) > 5.0$.

In an implementation, a total effective focal length f of the camera lens may satisfy: $f \geq 40$ mm.

In an implementation, the total effective focal length f of the camera lens and an effective focal length f1 of the first lens may satisfy: $1.5 < f/f1 < 3.5$.

In an implementation, the total effective focal length f of the camera lens, an effective focal length f2 of the second lens, and an effective focal length f3 of the third lens may satisfy: $-3.1 < f/f2 + f/f3 < 0$.

In an implementation, the total effective focal length f of the camera lens and an equivalent length FL of an actual propagation distance of the principal ray from an image side surface of the third lens to the imaging plane in the air may satisfy: $1.2 < f/FL < 1.6$.

In an implementation, a refractive index N2 of the second lens and a refractive index N3 of the third lens may satisfy: $1.6 < (N2+N3)/2 < 1.7$.

In an implementation, a dispersion coefficient V2 of the second lens and a dispersion coefficient V3 of the third lens may satisfy: $|V2-V3| < 10$.

In an implementation, a radius of curvature R1 of the object side surface of the first lens and a center thickness CT1 of the first lens may satisfy: $1.5 < R1/CT1 < 3.0$.

In an implementation, a radius of curvature R5 of an object side surface of the third lens and a radius of curvature R6 of an image side surface of the third lens may satisfy: $0 < R5/R6 < 1.0$.

In an implementation, a center thickness CT1 of the first lens, a center thickness CT2 of the second lens, and a center thickness CT3 of the third lens may satisfy: $1.0 < CT1/(CT2+CT3) < 2.5$.

In an implementation, a separation distance T12 between the first lens and the second lens on the optical axis and a center thickness CT2 of the second lens may satisfy: $1.5 < T12/CT2 < 3.0$.

In an implementation, the camera lens further comprises: at least one mirror, wherein the mirror is disposed in an object side direction of the first lens or an image side direction of the third lens, and a reflecting surface of the mirror is used to deflect the optical axis.

Another aspect of the present application provides a camera lens, comprising, in order from an object side to an image side along an optical axis: a first lens having a positive refractive power; a second lens; and a third lens; wherein a total effective focal length f of the camera lens and an equivalent length FL of an actual propagation distance of a principal ray from an image side surface of the third lens to an imaging plane in the air may satisfy: $1.2 < f/FL < 1.6$.

In an implementation, a total effective focal length f of the camera lens and the maximum semi-field of view Semi-FOV of the camera lens may satisfy: $f \times \tan(\text{Semi-FOV}) > 5.0$.

In an implementation, an equivalent length TL of an actual propagation distance of the principal ray from an object side surface of the first lens to the imaging plane in the air and an entrance pupil diameter EPD of the camera lens may satisfy: $3.5 < TL/EPD < 4.0$.

In an implementation, the total effective focal length f of the camera lens and an effective focal length f1 of the first lens may satisfy: $1.5 < f/f1 < 3.5$.

In an implementation, the total effective focal length f of the camera lens, an effective focal length f2 of the second lens, and an effective focal length f3 of the third lens may satisfy: $-3.1 < f/f2 + f/f3 < 0$.

In an implementation, a total effective focal length f of the camera lens may satisfy: $f \geq 40$ mm.

In an implementation, a refractive index N2 of the second lens and a refractive index N3 of the third lens may satisfy: $1.6 < (N2+N3)/2 < 1.7$.

In an implementation, a dispersion coefficient V2 of the second lens and a dispersion coefficient V3 of the third lens may satisfy: |V2−V3|<10.

In an implementation, a radius of curvature R1 of the object side surface of the first lens and a center thickness CT1 of the first lens may satisfy: 1.5<R1/CT1<3.0.

In an implementation, a radius of curvature R5 of an object side surface of the third lens and a radius of curvature R6 of an image side surface of the third lens may satisfy: 0<R5/R6<1.0.

In an implementation, a center thickness CT1 of the first lens, a center thickness CT2 of the second lens, and a center thickness CT3 of the third lens may satisfy: 1.0<CT1/(CT2+CT3)<2.5.

In an implementation, a separation distance T12 between the first lens and the second lens on the optical axis and a center thickness CT2 of the second lens may satisfy: 1.5<T12/CT2<3.0.

In an implementation, the camera lens further comprises: at least one mirror, wherein the mirror is disposed in an object side direction of the first lens or an image side direction of the third lens, and a reflecting surface of the mirror is used to deflect the optical axis.

In an implementation, at least one plastic lens is included in the first lens to the third lens.

In an implementation, there is at least one aspherical lens surface from the object side surface of the first lens to an image side surface of the third lens.

In the present application, three lenses are adopted. The refractive power, surface type and center thickness of each lens, the on-axis distances between the respective lenses, and the like are reasonably distributed, so that the aforementioned camera lens has at least one beneficial effect of miniaturization, light weight, good imaging sharpness, telephoto, and so on.

BRIEF DESCRIPTION OF THE DRAWINGS

Other features, objectives, and advantages of the present application will become more apparent by reading a detailed description of non-restrictive embodiments made with reference to the following drawings. In the drawings:

FIGS. 15A to 15D show a longitudinal aberration curve, astigmatism curve, distortion curve and lateral color curve of the camera lens according to Embodiment 8, respectively.

DETAILED DESCRIPTION

Figure 1:
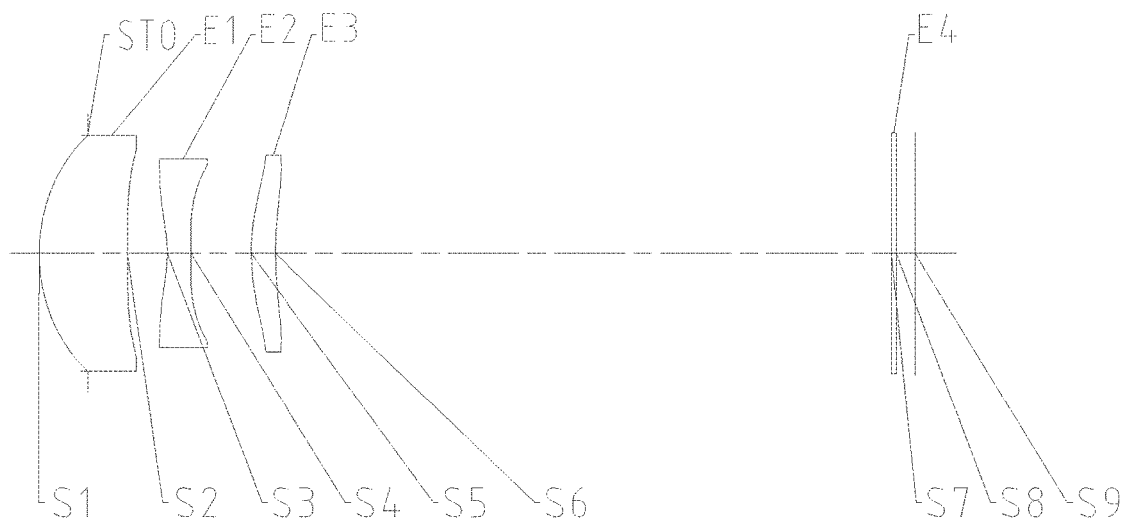
FIG. 1 shows a schematic structural diagram of the camera lens according to Embodiment 1 of the present application.

In order to better understand the present application, various aspects of the present application will be described in more detail with reference to the drawings. It should be understood that the detailed description is merely description of exemplary implementations of the present application, and does not limit the scope of the present application in any way. Throughout the description, the same reference numerals refer to the same elements. The expression "and/or" includes any and all combinations of one or more of the associated listed items.

It should be noted that in the present description, the expressions of "first", "second", "third" etc. are only used to distinguish one feature from another feature, and do not indicate any limitation on the feature. Therefore, without departing from the teachings of the present application, a first lens discussed below may also be referred to as a second lens or a third lens.

In the drawings, for convenience of explanation, the thickness, size, and shape of the lens have been slightly exaggerated. Specifically, the shapes of spherical or aspherical surfaces shown in the drawings are shown by way of example. That is, the shapes of the spherical or aspheric surfaces are not limited to those shown in the drawings. The drawings are only examples and are not drawn strictly to scale.

Herein, a paraxial region refers to a region near an optical axis. If a lens surface is convex and the position of the convex surface is not defined, then it means that the lens surface is convex at least in the paraxial region; and if the lens surface is concave and the position of the concave surface is not defined, then it means that the lens surface is concave at least in the paraxial region. A surface of each lens closest to a subject (=an object to be captured) is referred as an object side surface of the lens, and a surface of each lens closest to an imaging plane is referred as an image side surface of the lens.

It should also be understood that the terms "comprising", "comprise", "having", "including" and/or "include" when used in the present description, indicate the existence of stated features, elements and/or components, but does not exclude the presence or addition of one or more other features, elements, components and/or combinations thereof. Furthermore, when an expression such as "at least one of" appears before the list of listed features, it modifies the entire list of listed features, rather than the individual elements in the list. In addition, when describing the implementations of the present application, the use of "may" means "one or more implementations of the present application", and, the term "exemplary" refers to an example or illustration.

Unless otherwise defined, all terms (including technical and scientific terms) used herein have the same meanings as commonly understood by those of ordinary skill in the art to which the present application belongs. It should also be understood that the terms (such as those defined in commonly used dictionaries) should be interpreted to have meanings consistent with their meaning in the context of the relevant art and will not be interpreted in an idealized or overly formal sense unless it is clearly defined herein.

It needs to be explained that, in the case of no conflict, the embodiments in the present application and the features in the embodiments can be combined with each other. The present application will be described in detail below in conjunction with embodiments with reference to the drawings.

The features, principles and other aspects of the present application will be described in detail below.

A camera lens according to an exemplary implementation of the present application may include, for example, three lenses having refractive powers, i.e., a first lens, a second lens and a third lens. The three lenses are arranged in order from an object side to an image side along an optical axis. There may be an air gap between any two adjacent lenses of the first to third lenses.

In an exemplary implementation, the first lens may have a positive refractive power. The second lens has a positive refractive power or a negative refractive power.

The third lens has a positive refractive power or a negative refractive power. The positive and negative distribution of the refractive power of each component of the camera lens is reasonably controlled to effectively balance and control the low-order aberration of the camera lens.

In an exemplary implementation, the camera lens further includes: at least one mirror. For example, it includes a first mirror, which is disposed in an object side direction of the first lens, and a reflecting surface of the first mirror is used to deflect the optical axis. For example, it includes a second mirror, which can be disposed in an image side direction of the third lens, and a reflecting surface of the second mirror is used to deflect the optical axis.

An imaging plane is located on an image side of the second mirror. The provision of the mirror can reduce a total length of the camera lens in a single direction, thereby facilitating installation in devices with a small space such as mobile phones. Optionally, the mirror may be a total reflection mirror, a prism, or other optical elements that deflect the optical axis.

Illustratively, both the first mirror and the second mirror are prisms. Illustratively, both the first mirror and the second mirror are flat glass mirrors.

In an exemplary implementation, the camera optical lens of the present application may satisfy a conditional expression of f≥40 mm, where f is a total effective focal length of the camera lens. The camera lens satisfies f≥40 mm, which can ensure that it has a sufficient focal length and then has a telephoto effect. More specifically, f may satisfy: 40 mm≤f≤50 mm.

In an exemplary implementation, the camera lens of the present application may satisfy a conditional expression of f×tan(Semi-FOV)>5.0, where f is the total effective focal length of the camera lens, and Semi-FOV is the maximum semi-field of view of the camera lens. The camera lens satisfies f×tan(Semi-FOV)>5.0, so that it can have a sufficient field of view, and then the interference to imaging caused by shaking can be reduced when the camera lens is used. More specifically, f and Semi-FOV may satisfy: 5.10<f×tan(Semi-FOV)<6.20.

In an exemplary implementation, the camera lens of the present application may satisfy a conditional expression of 3.5<TL/EPD<4.0, where TL is an equivalent length of an actual propagation distance of a principal ray from an object side surface of the first lens to the imaging plane in the air, and EPD is an entrance pupil diameter of the camera lens. The light incident on the camera lens has a principal ray. Illustratively, the principal ray may propagate along the optical axis. The camera lens satisfies 3.5<TL/EPD<4.0, so that the length from the lens group to the imaging plane can be controlled to avoid affecting the total length of the camera lens group, thereby ensuring the miniaturization of the camera lens group. More specifically, TL and EPD may satisfy: 3.60<TL/EPD<3.93.

In an exemplary implementation, the camera lens of the present application may satisfy a conditional expression of 1.5<f/f1<3.5, where f is the total effective focal length of the camera lens, and f1 is an effective focal length of the first lens. The camera lens satisfies 1.5<f/f1<3.5, which is advantageous to ensure high image quality while taking into account good manufacturability. If the positive focal length of the first lens is too long, it is disadvantageous for correcting the aberration, and if it is too short, it is disadvantageous for machining. More specifically, f and f1 may satisfy: 1.88<f/f1<3.08.

In an exemplary implementation, the camera lens of the present application may satisfy a conditional expression of −3.1<f/f2+f/f3<0, where f is the total effective focal length of the camera lens, f2 is an effective focal length of the second lens, and f3 is an effective focal length of the third lens. The camera lens satisfies −3.1<f/f2+f/f3<0, which can ensure that the second lens and the third lens have a negative refractive power as a whole, thereby ensuring that when the length of the camera lens is within a limited size, the effective focal length of the camera lens is maximized as much as possible. More specifically, f, f2, and f3 may satisfy: −3.05<f/f2+f/f3<−0.85.

In an exemplary implementation, the camera lens of the present application may satisfy a conditional expression of 1.2<f/FL<1.6, where f is the total effective focal length of the camera lens, and FL is an equivalent length of an actual propagation distance of the principal ray from an image side surface of the third lens to the imaging plane in the air. The camera lens satisfies 1.2<f/FL<1.6, which can ensure that the total effective focal length is greater than the actual length of the camera lens. More specifically, f and FL may satisfy: 1.35<f/FL<1.55.

In an exemplary implementation, the camera lens of the present application may satisfy a conditional expression of 1.6<(N2+N3)/2<1.7, where N2 is a refractive index of the second lens, and N3 is a refractive index of the third lens. The camera lens satisfies 1.6<(N2+N3)/2<1.7, so that the second lens and the third lens can have high refractive indices, and thereby the two lenses can be matched with the first lens to reduce chromatic aberration.

In an exemplary implementation, the camera lens of the present application may satisfy a conditional expression of |V2−V3|<10, where V2 is a dispersion coefficient of the second lens, and V3 is a dispersion coefficient of the third lens. The camera lens satisfies |V2−V3|<10, so that the second lens and the third lens can be better matched with the first lens to reduce chromatic aberration. More specifically, V2 and V3 may satisfy: $4.5<|V2-V3|<5$.

In an exemplary implementation, the camera lens of the present application may satisfy a conditional expression of $1.5<R1/CT1<3.0$, where R1 is a radius of curvature of the object side surface of the first lens, and CT1 is a center thickness of the first lens. The camera lens satisfies $1.5<R1/CT1<3.0$, which can effectively reduce spherical aberration and astigmatism. More specifically, R1 and CT1 may satisfy: $1.85<R1/CT1<2.70$.

In an exemplary implementation, the camera lens of the present application may satisfy a conditional expression of $0<R5/R6<1.0$, where R5 is a radius of curvature of an object side surface of the third lens, and R6 is a radius of curvature of an image side surface of the third lens. The camera lens satisfies $0<R5/R6<1.0$, which can make the third lens have good manufacturability. More specifically, R5 and R6 may satisfy: $0<R5/R6<0.75$.

In an exemplary implementation, the camera lens of the present application may satisfy a conditional expression of $1.0<CT1/(CT2+CT3)<2.5$, where CT1 is a center thickness of the first lens, CT2 is a center thickness of the second lens, and CT3 is a center thickness of the third lens. The camera lens satisfies $1.0<CT1/(CT2+CT3)<2.5$, which can control the thickness of each lens on the optical axis, thus effectively taking into account the manufacturability and image quality. If the center thickness of the second lens and the center thickness of the third lens are too large, it is disadvantageous for the correction of monochromatic aberration, and if the two are too small, it is disadvantageous for assembly. More specifically, CT1, CT2, and CT3 may satisfy: $1.30<CT1/(CT2+CT3)<2.48$.

In an exemplary implementation, the camera lens of the present application may satisfy a conditional expression of $1.5<T12/CT2<3.0$, where T12 is a separation distance between the first lens and the second lens on the optical axis, and CT2 is the center thickness of the second lens. The camera lens satisfies $1.5<T12/CT2<3.0$, which is advantageous to ensure the high imaging quality of the camera lens, and facilitates the miniaturization of the camera lens. More specifically, T12 and CT2 satisfy: $1.65<T12/CT2<2.75$.

In an exemplary implementation, at least one plastic lens is included in the first lens to the third lens. The plastic lens can make the camera lens more lightweight while ensuring the imaging quality as much as possible.

In an exemplary implementation, the aforementioned camera lens may further include at least one diaphragm. The diaphragm can be disposed at an appropriate position as needed, for example, between the object side and the first lens. Optionally, the aforementioned camera lens may further include a filter for correcting color deviation and/or a protective glass for protecting a photosensitive element located on the imaging plane.

The camera lens according to the aforementioned implementations of the present application may adopt multiple lens sheets, for example, three sheets as described above. The refractive power, surface type and center thickness of each lens, the on-axis distances between the respective lenses, and the like are reasonably distributed, which can effectively reduce the volume of the camera lens, reduce the sensitivity of the camera lens, and improve the machinability of the camera lens. At the same time, the camera lens of the present application also has excellent optical performance of telephoto, good imaging sharpness and so on.

In the implementations of the present application, at least one of lens surfaces of all the lenses is an aspherical lens surface, that is, at least one of the object side surface of the first lens to the image side surface of the third lens is an aspherical lens surface. An aspherical lens is characterized in that the curvature changes continuously from the center of the lens to the periphery of the lens. Unlike a spherical lens having a constant curvature from the center of the lens to the periphery of the lens, the aspherical lens has better radius-of-curvature properties, and has the advantages of improving distortion aberration and improving astigmatism aberration. After the aspherical lens is adopted, the aberrations that occur during imaging can be eliminated as much as possible, thereby improving the imaging quality. Optionally, at least one of an object side surface and an image side surface of each of the first lens, the second lens and the third lens is an aspherical lens surface. Optionally, both the object side surface and the image side surface of each of the first lens, the second lens and the third lens are aspherical lens surfaces.

However, it should be understood by those skilled in the art that the number of lenses constituting the camera lens can be changed without departing from the technical solution claimed in the present application, to obtain respective results and advantages described in the description. For example, although three lenses have been described in the implementations as an example, the camera lens is not limited to including the three lenses. If necessary, the camera lens may also include other numbers of lenses.

Specific embodiments of the camera lens applicable to the aforementioned implementations will be further described below with reference to the drawings.

Embodiment 1

A camera lens according to Embodiment 1 of the present application will be described below with reference to FIGS. 1 to 2D. FIG. 1 shows a schematic structural diagram of the camera lens according to Embodiment 1 of the present application.

As shown in FIG. 1, the camera lens includes a diaphragm STO, a first lens E1, a second lens E2, a third lens E3, and a filter E4 in order from an object side to an image side along an optical axis.

The first lens E1 has a positive refractive power, and has a convex object side surface S1 and a concave image side surface S2. The second lens E2 has a negative refractive power, and has a concave object side surface S3 and a convex image side surface S4. The third lens E3 has a positive refractive power, and has a convex object side surface S5 and a concave image side surface S6. The filter E4 has an object side surface S7 and an image side surface S8. The camera lens has an imaging plane S9.

Light from an object sequentially passes through the respective surfaces S1 to S8 and finally forms an image on the imaging plane S9.

Table 1 shows a table of basic parameters of the camera lens of Embodiment 1, wherein the units of the radius of curvature, thickness/distance, and focal length are all millimeters (mm).

TABLE 1

| Surface No. | Surface type | Radius of curvature | Thickness/distance | Material Refractive index | Dispersion coefficient | Focal length | Conic coefficient |
|---|---|---|---|---|---|---|---|
| OBJ | Spherical | Infinity | Infinity | | | | |
| STO | Spherical | Infinity | 2.0511 | | | | |
| S1 | Aspherical | 7.4399 | 3.7276 | 1.546 | 56.09 | 14.14 | 0.0000 |
| S2 | Aspherical | 168.2049 | 1.6922 | | | | 0.0000 |
| S3 | Aspherical | −5.4411 | 1.0000 | 1.640 | 23.98 | −10.11 | 0.0000 |
| S4 | Aspherical | −36.7893 | 2.5468 | | | | 0.0000 |
| S5 | Aspherical | 8.9716 | 1.0334 | 1.677 | 19.24 | 28.83 | 0.0000 |
| S6 | Aspherical | 15.8317 | 26.1312 | | | | 0.0000 |
| S7 | Spherical | Infinity | 0.2100 | 1.517 | 64.17 | | |
| S8 | Spherical | Infinity | 0.7794 | | | | |
| S9 | Spherical | Infinity | | | | | |

In Embodiment 1, a total effective focal length f of the camera lens has a value of 40.00 mm, and an aperture number Fno of the camera lens has a value of 4.0.

In Embodiment 1, both the object side surface and image side surface of any one of the first lens E1 to the third lens E3 are aspherical, and the surface shape x of each aspherical lens can be defined by using but not limited to the following aspherical formula:

$$x = \frac{ch^2}{1 + \sqrt{1 - (k+1)c^2 h^2}} + \sum A_i h^i \quad (1)$$

where x is a distance vector height from a vertex of the aspherical surface when the aspherical surface is at a height of h along the optical axis direction: c is paraxial curvature of the aspherical surface, c=1/R (that is, the paraxial curvature c is the reciprocal of the radius of curvature R in Table 1 above); k is a conic coefficient; and Ai is a correction coefficient of an i-th order of the aspherical surface. Higher-order coefficients $A_4, A_6, A_8, A_{10}, A_{12}, A_{14}, A_{16},$ and $A_{18}$ of each aspherical lens surface S1 to S6 that is applicable in Embodiment 1 are given in Table 2 below.

Figure 2A:
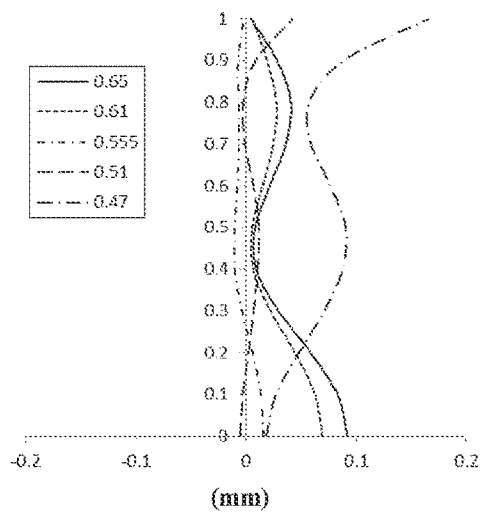
FIGS. 2A to 2D show a longitudinal aberration curve, astigmatism curve, distortion curve and lateral color curve of the camera lens according to Embodiment 1, respectively.
Figure 2B:
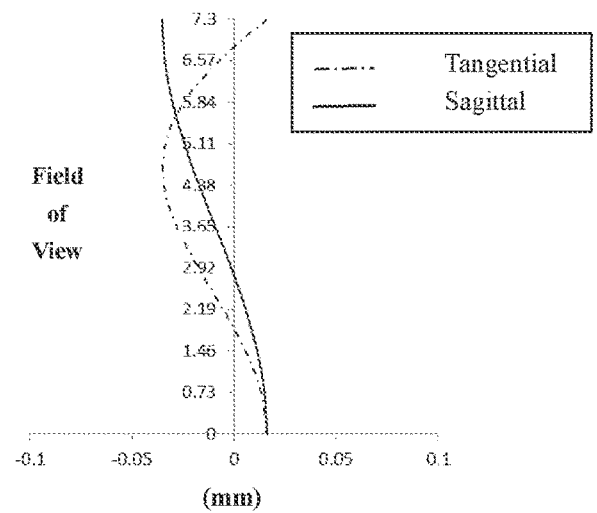
Figure 2C:
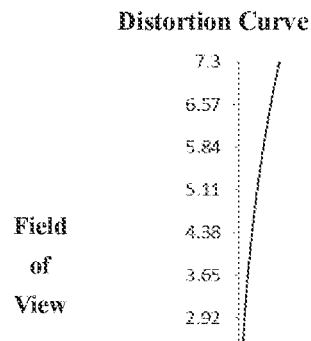
Figure 2D:
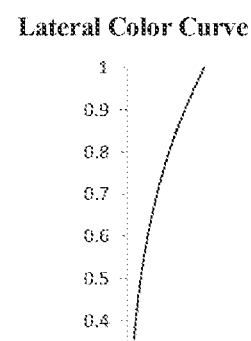

FIG. 2A shows a longitudinal aberration curve of the camera lens according to Embodiment 1, which represents the deviation of the converged focal point after light of different wavelengths passes through the lens. FIG. 2B shows an astigmatism curve of the camera lens according to Embodiment 1, which represents the curvature of the tangential image plane and the curvature of the sagittal image plane. FIG. 2C shows a distortion curve of the camera lens according to Embodiment 1, which represents distortion magnitude values corresponding to different image heights. FIG. 2D shows a lateral color curve of the camera lens according to Embodiment 1, which represents the deviation of different image heights on the imaging plane after light passes through the lens. According to FIGS. 2A to 2D, it can be seen that the camera lens given in Embodiment 1 can achieve good imaging quality.

Embodiment 2

Figure 3:
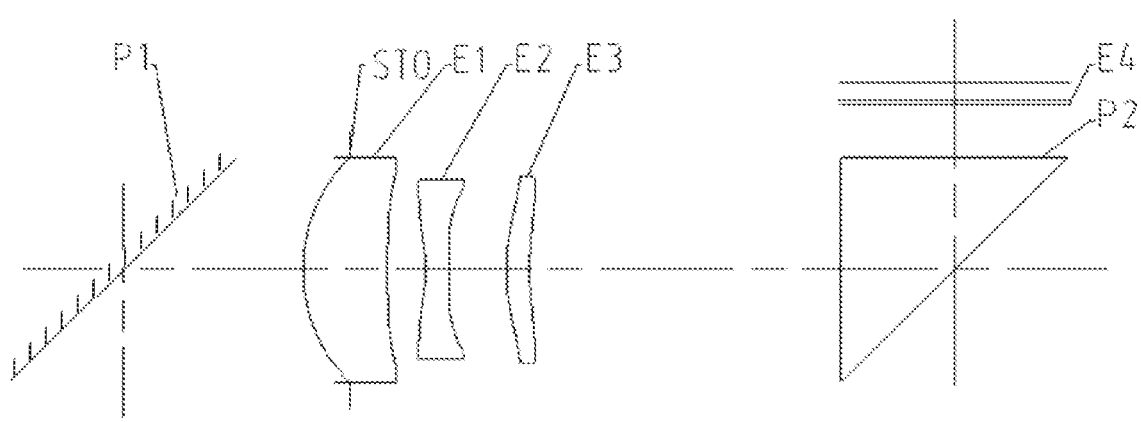
FIG. 3 shows a schematic structural diagram of the camera lens according to Embodiment 2 of the present application.

With reference to Embodiment 1, referring to FIG. 3, compared with the imaging lens provided in Embodiment 1, the camera lens according to Embodiment 2 of the present application further includes a first mirror P1 and a second mirror P2. Illustratively, a material of the first mirror P1 is glass, and a material of the second mirror P2 is glass. Illustratively, the first mirror P1 is a total reflection mirror, which includes a reflecting surface. The second mirror P2 is a prism, and the prism includes an object side surface, a reflecting surface, and an image side surface disposed from an object side to an image side along an optical axis direction.

The first mirror P1 is disposed on an object side of the first lens E1, and an included angle between its reflecting surface

TABLE 2

| Surface No. | A4 | A6 | A8 | A10 | A12 | A14 | A16 | A18 |
|---|---|---|---|---|---|---|---|---|
| S1 | 1.0604E−01 | 1.7464E−02 | 6.2033E−04 | 2.2685E−04 | 2.7833E−05 | 4.2923E−06 | 6.2506E−07 | 7.7516E−08 |
| S2 | 3.3077E−01 | −1.2900E−02 | −6.9420E−03 | 1.4370E−03 | −1.5246E−04 | −6.7705E−05 | 1.1130E−05 | 0.0000E+00 |
| S3 | 1.5702E+00 | −1.8694E−01 | 3.5107E−02 | −4.6793E−03 | 7.9876E−04 | −2.3087E−04 | 3.8102E−05 | 1.9138E−07 |
| S4 | 9.7496E−01 | −1.2497E−01 | 2.2564E−02 | −2.5068E−04 | −2.5296E−04 | −2.6741E−05 | 4.0371E−06 | 1.3009E−07 |
| S5 | −3.6948E−01 | −2.2121E−02 | 3.0532E−03 | 3.1687E−03 | −6.5312E−04 | −2.9579E−05 | 9.9989E−06 | 6.1096E−08 |
| S6 | −3.1113E−01 | −1.9934E−02 | 1.9475E−03 | 2.4722E−03 | −6.8904E−04 | 6.3169E−05 | −1.5012E−06 | 0.0000E+00 | and the optical axis is 45°. The first mirror P1 is used to deflect the optical axis by 90°. The second mirror P2 is disposed between the third lens E3 and the filter E4, and an included angle between its reflecting surface and the optical axis is 45°. The second mirror P2 is used to deflect the optical axis by 90°.

Table 3 shows a table of basic parameters of the camera lens of Embodiment 2, wherein the units of the radius of curvature, thickness/distance, and focal length are all millimeters (mm).

TABLE 3

| Surface No. | Surface type | Radius of curvature | Thickness/ distance | Material Refractive index | Dispersion coefficient | Focal length | Conic coefficient |
|---|---|---|---|---|---|---|---|
| OBJ | Spherical | Infinity | Infinity | | | | |
| (P1) | Spherical | Infinity | −10.0000 | | | | |
| STO | Spherical | Infinity | 2.0511 | | | | |
| S1 | Aspherical | −7.4399 | −3.7276 | 1.546 | 56.09 | 14.14 | 0.0000 |
| S2 | Aspherical | −168.2049 | −1.6922 | | | | 0.0000 |
| S3 | Aspherical | 5.4411 | −1.0000 | 1.640 | 23.98 | −10.11 | 0.0000 |
| S4 | Aspherical | 36.7893 | −2.5468 | | | | 0.0000 |
| S5 | Aspherical | −8.9716 | −1.0334 | 1.677 | 19.24 | 28.83 | 0.0000 |
| S6 | Aspherical | −15.8317 | −13.7656 | | | | 0.0000 |
| (P2) | Spherical | Infinity | −5.0000 | | | | |
| | Spherical | Infinity | 5.0000 | | | | |
| | Spherical | Infinity | 2.3656 | | | | |
| S7 | Spherical | Infinity | 0.2100 | 1.518 | 64.17 | | |
| S8 | Spherical | Infinity | 0.7794 | | | | |
| S9 | Spherical | Infinity | | | | | |

In Embodiment 2, a total effective focal length f of the camera lens has a value of 40.00 mm, and an aperture number Fno of the camera lens has a value of 4.0. The camera given in Embodiment 2 can achieve good imaging quality and has a short size in the optical axis direction at the lens group.

Embodiment 3

Figure 4:
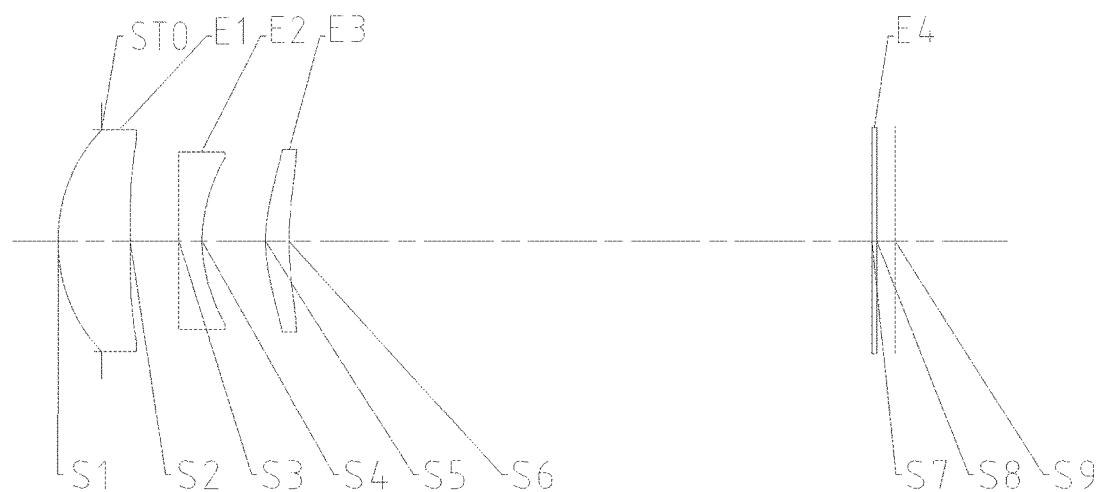
FIG. 4 shows a schematic structural diagram of the camera lens according to Embodiment 3 of the present application.

A camera lens according to Embodiment 3 of the present application will be described below with reference to FIGS. 4 to 5D. In this embodiment and the following embodiments, for the sake of brevity, the description of parts similar to those in Embodiment 1 will be omitted. FIG. 4 shows a schematic structural diagram of the camera lens according to Embodiment 3 of the present application.

As shown in FIG. 4, the camera lens includes a diaphragm STO, a first lens E1, a second lens E2, a third lens E3, and a filter E4 in order from an object side to an image side along an optical axis.

The first lens E1 has a positive refractive power, and has a convex object side surface S1 and a concave image side surface S2. The second lens E2 has a negative focal power, and has a concave object side surface S3 and a concave image side surface S4. The third lens E3 has a positive refractive power, and has a convex object side surface S5 and a concave image side surface S6. The filter E4 has an object side surface S7 and an image side surface S8. The camera lens has an imaging plane S9. Light from an object sequentially passes through the respective surfaces S1 to S8 and finally forms an image on the imaging plane S9.

In Embodiment 3, a total effective focal length f of the camera lens has a value of 40 mm, and an aperture number Fno of the camera lens has a value of 4.0.

Table 4 shows a table of basic parameters of the camera lens of Embodiment 3, wherein the units of the radius of curvature, thickness/distance, and focal length are all millimeters (mm). Table 5 shows higher-order coefficients of each aspherical lens surface that are applicable in Embodiment 3, wherein the surface shape of each aspherical surface can be defined by formula (1) given in Embodiment 1 described above.

TABLE 4

| Surface No. | Surface type | Radius of curvature | Thickness/ distance | Material Refractive index | Dispersion coefficient | Focal length | Conic coefficient |
|---|---|---|---|---|---|---|---|
| OBJ | Spherical | Infinity | Infinity | | | | |
| STO | Spherical | Infinity | −1.8796 | | | | |
| S1 | Aspherical | 8.0477 | 3.1195 | 1.546 | 56.09 | 14.95 | 0.0000 |
| S2 | Aspherical | 494.2476 | 2.1074 | | | | 0.0000 |
| S3 | Aspherical | −134.7750 | 1.0000 | 1.640 | 23.98 | −9.57 | 0.0000 |
| S4 | Aspherical | 6.4312 | 2.7454 | | | | 0.0000 |
| S5 | Aspherical | 7.0030 | 1.0276 | 1.677 | 19.24 | 23.45 | 0.0000 |
| S6 | Aspherical | 11.7907 | 25.3016 | | | | 0.0000 |
| S7 | Spherical | Infinity | 0.2100 | 1.518 | 64.17 | | |
| S8 | Spherical | Infinity | 0.7900 | | | | |
| S9 | Spherical | Infinity | | | | | |

TABLE 5

| Surface No. | A4 | A6 | A8 | A10 | A12 | A14 | A16 | A18 |
|---|---|---|---|---|---|---|---|---|
| S1 | 1.3535E−01 | 5.4692E−03 | 7.7583E−04 | 8.7696E−05 | 1.0756E−05 | 1.3134E−06 | 1.4473E−07 | 0.0000E+00 |
| S2 | 2.8421E−01 | −3.0905E−02 | 3.1711E−03 | −5.5795E−04 | 1.4432E−04 | −1.4516E−05 | 2.0559E−06 | 0.0000E+00 |
| S3 | 4.4099E−02 | −7.6868E−03 | 1.0703E−03 | −7.9124E−05 | 3.1284E−06 | −6.2704E−08 | 0.0000E+00 | 0.0000E+00 |

TABLE 5-continued

| Surface No. | A4 | A6 | A8 | A10 | A12 | A14 | A16 | A18 |
|---|---|---|---|---|---|---|---|---|
| S4 | −2.2564E−01 | 3.5583E−02 | −2.6642E−03 | 1.1183E−03 | −2.7727E−04 | 2.2572E−05 | −4.1540E−07 | 0.0000E+00 |
| S5 | −6.2749E−01 | 3.6566E−02 | −7.7446E−03 | 2.1641E−03 | −7.9790E−04 | 2.2881E−04 | −1.4390E−05 | −1.5569E−07 |
| S6 | −4.1469E−01 | 2.5441E−02 | −7.1183E−03 | 2.2026E−03 | −8.5197E−04 | 3.4930E−04 | −4.7817E−05 | −7.8063E−08 |

Figures 5A, 5B:
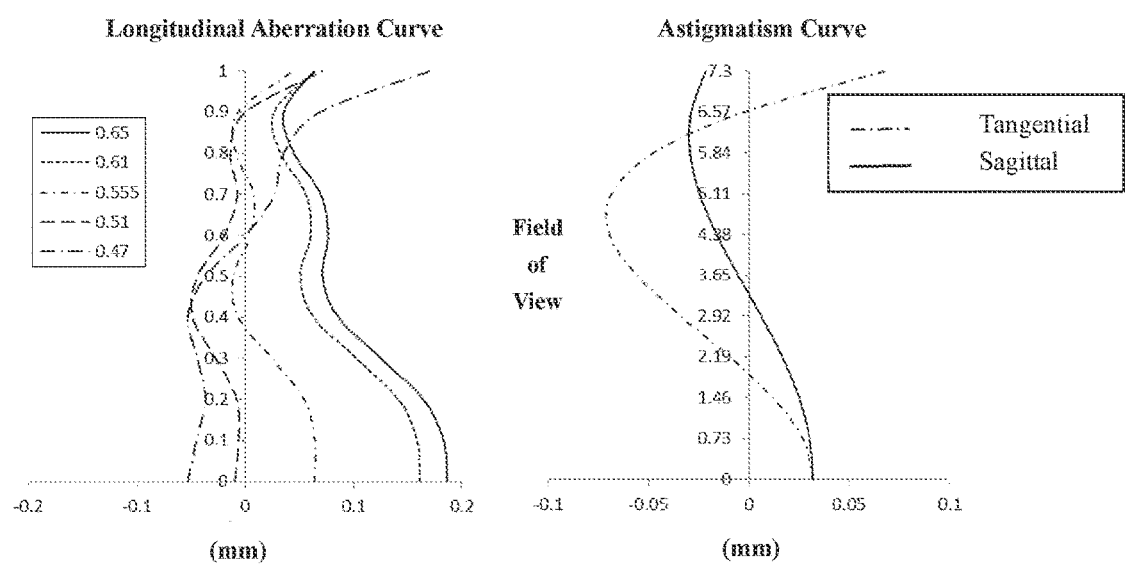
FIGS. 5A to 5D show a longitudinal aberration curve, astigmatism curve, distortion curve and lateral color curve of the camera lens according to Embodiment 3, respectively.
Figure 5C:
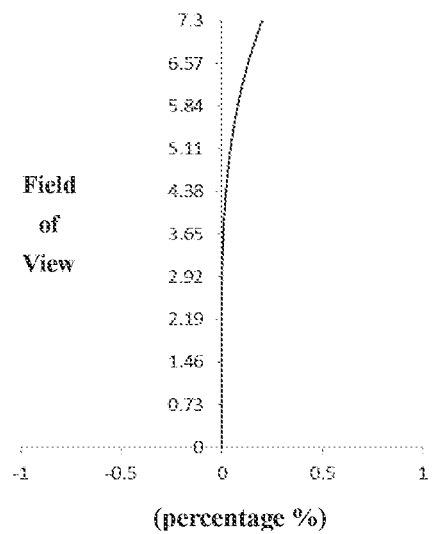
Figure 5D:
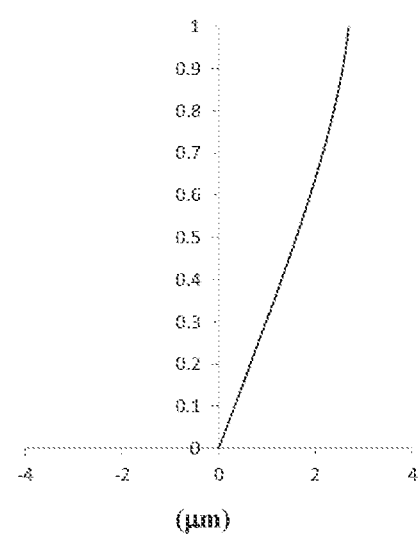

FIG. 5A shows a longitudinal aberration curve of the camera lens according to Embodiment 3, which represents the deviation of the converged focal point after light of different wavelengths passes through the lens. FIG. 5B shows an astigmatism curve of the camera lens according to Embodiment 3, which represents the curvature of the tangential image plane and the curvature of the sagittal image plane. FIG. 5C shows a distortion curve of the camera lens according to Embodiment 3, which represents distortion magnitude values corresponding to different image heights. FIG. 5D shows a lateral color curve of the camera lens according to Embodiment 3, which represents the deviation of different image heights on the imaging plane after light passes through the lens. According to FIGS. 5A to 5D, it can be seen that the camera lens given in Embodiment 3 can achieve good imaging quality.

Embodiment 4

Figure 6:
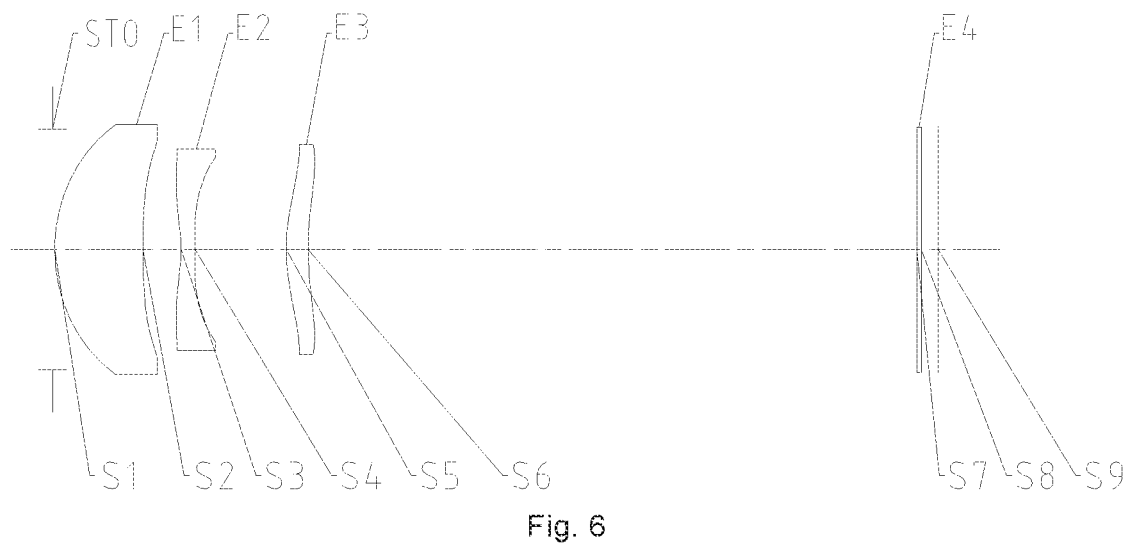
FIG. 6 shows a schematic structural diagram of the camera lens according to Embodiment 4 of the present application.

A camera lens according to Embodiment 4 of the present application will be described below with reference to FIGS. 6 to 7D. FIG. 6 shows a schematic structural diagram of the camera lens according to Embodiment 4 of the present application.

As shown in FIG. 6, the camera lens includes a diaphragm STO, a first lens E1, a second lens E2, a third lens E3, and a filter E4 in order from an object side to an image side along an optical axis.

The first lens E1 has a positive refractive power, and has a convex object side surface S1 and a concave image side surface S2. The second lens E2 has a negative refractive power, and has a concave object side surface S3 and a convex image side surface S4. The third lens E3 has a positive refractive power, and has a convex object side surface S5 and a concave image side surface S6. The filter E4 has an object side surface S7 and an image side surface S8. The camera lens has an imaging plane S9. Light from an object sequentially passes through the respective surfaces S1 to S8 and finally forms an image on the imaging plane S9.

In Embodiment 4, a total effective focal length f of the camera lens has a value of 45 mm, and an aperture number Fno of the camera lens has a value of 4.0.

Table 6 shows a table of basic parameters of the camera lens of Embodiment 4, wherein the units of the radius of curvature, thickness/distance, and focal length are all millimeters (mm). Table 7 shows higher-order coefficients of each aspherical lens surface that are applicable in Embodiment 4, wherein the surface shape of each aspherical surface can be defined by formula (1) given in Embodiment 1 described above.

TABLE 6

| Surface No. | Surface type | Radius of curvature | Thickness/ distance | Material | | Focal length | Conic coefficient |
|---|---|---|---|---|---|---|---|
| | | | | Refractive index | Dispersion coefficient | | |
| OBJ | Spherical | Infinity | Infinity | | | | |
| STO | Spherical | Infinity | 0.1000 | | | | |
| S1 | Aspherical | 7.8470 | 4.1323 | 1.546 | 56.09 | 16.60 | 0.0000 |
| S2 | Aspherical | 47.5459 | 1.7854 | | | | 0.0000 |
| S3 | Aspherical | −6.5848 | 0.6584 | 1.640 | 23.98 | −12.95 | 0.0000 |
| S4 | Aspherical | −33.3477 | 4.2677 | | | | 0.0000 |
| S5 | Aspherical | 9.5949 | 1.0188 | 1.677 | 19.24 | 40.79 | 0.0000 |
| S6 | Aspherical | 14.0736 | 28.5040 | | | | 0.0000 |
| S7 | Spherical | Infinity | 0.2100 | 1.518 | 64.17 | | |
| S8 | Spherical | Infinity | 0.7900 | | | | |
| S9 | Spherical | Infinity | | | | | |

TABLE 7

| Surface No. | A4 | A6 | A8 | A10 | A12 | A14 | A16 | A18 |
|---|---|---|---|---|---|---|---|---|
| S1 | 1.9432E−01 | 3.3906E−02 | 5.0773E−03 | 1.1410E−03 | −6.6170E−06 | −1.5613E−04 | 1.9649E−05 | 1.4131E−06 |
| S2 | 4.4427E−01 | −2.8415E−02 | −9.5257E−03 | 5.6112E−04 | −1.9637E−03 | −3.8187E−05 | 1.8771E−04 | 1.4115E−06 |
| S3 | 2.0689E+00 | −3.0894E−01 | 6.7953E−02 | −1.6277E−02 | 1.3698E−03 | −1.7346E−04 | 8.1213E−05 | −4.0069E−07 |
| S4 | 1.3969E+00 | −1.8786E−01 | 4.9449E−02 | −6.7569E−03 | −3.0570E−04 | 2.5486E−04 | −5.1795E−05 | −2.0704E−07 |
| S5 | −6.8482E−01 | −1.7039E−02 | 5.9294E−03 | 8.2019E−05 | −1.6987E−03 | 1.8530E−04 | −3.7948E−05 | −1.0404E−06 |
| S6 | −6.2059E−01 | −1.7305E−02 | 4.9000E−03 | −5.6570E−04 | −1.4362E−03 | 2.9084E−04 | −6.9751E−05 | −2.5269E−07 |

Figure 7A:
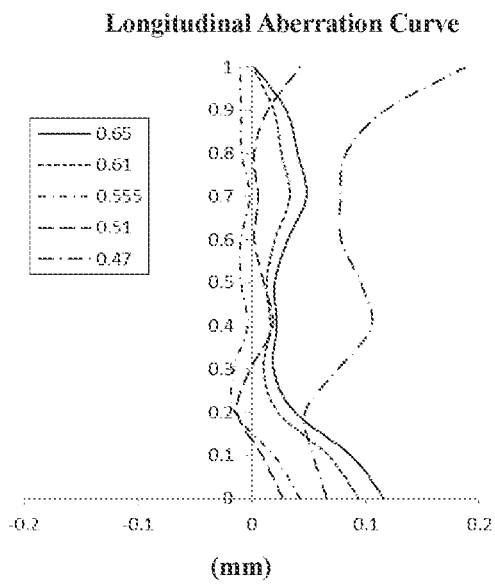
FIGS. 7A to 7D show a longitudinal aberration curve, astigmatism curve, distortion curve and lateral color curve of the camera lens according to Embodiment 4, respectively.
Figure 7B:
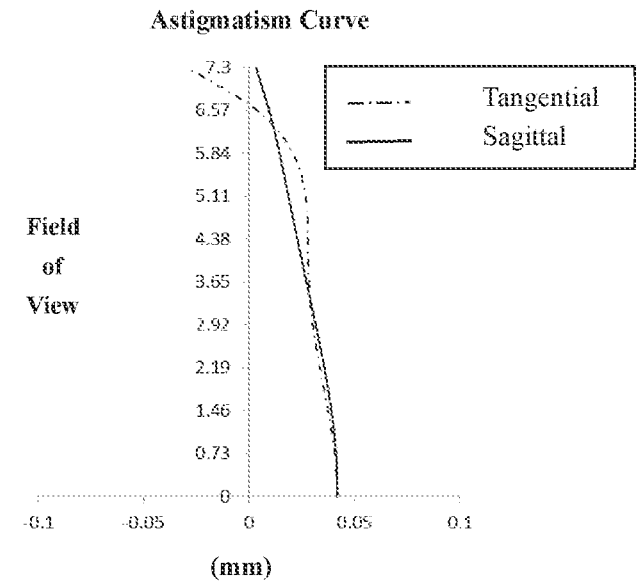
Figure 7C:
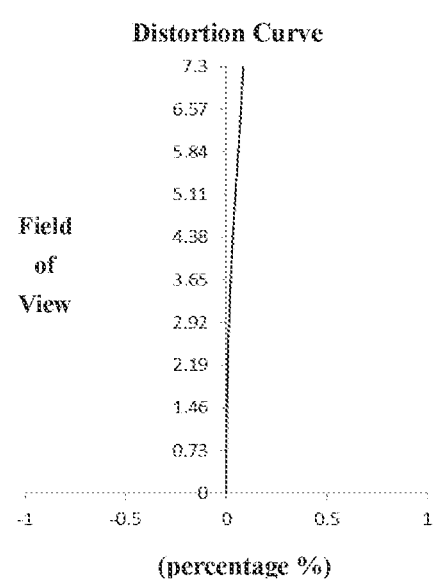
Figure 7D:
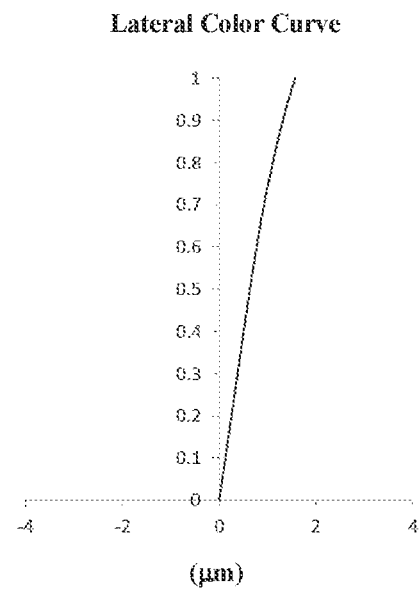

FIG. 7A shows a longitudinal aberration curve of the camera lens according to Embodiment 4, which represents the deviation of the converged focal point after light of different wavelengths passes through the lens. FIG. 7B shows an astigmatism curve of the camera lens according to Embodiment 4, which represents the curvature of the tangential image plane and the curvature of the sagittal image plane. FIG. 7C shows a distortion curve of the camera lens according to Embodiment 4, which represents distortion magnitude values corresponding to different image heights. FIG. 7D shows a lateral color curve of the camera lens according to Embodiment 4, which represents the deviation of different image heights on the imaging plane after light passes through the lens. According to FIGS. 7A to 7D, it can be seen that the camera lens given in Embodiment 4 can achieve good imaging quality.

Embodiment 5

Figure 8:
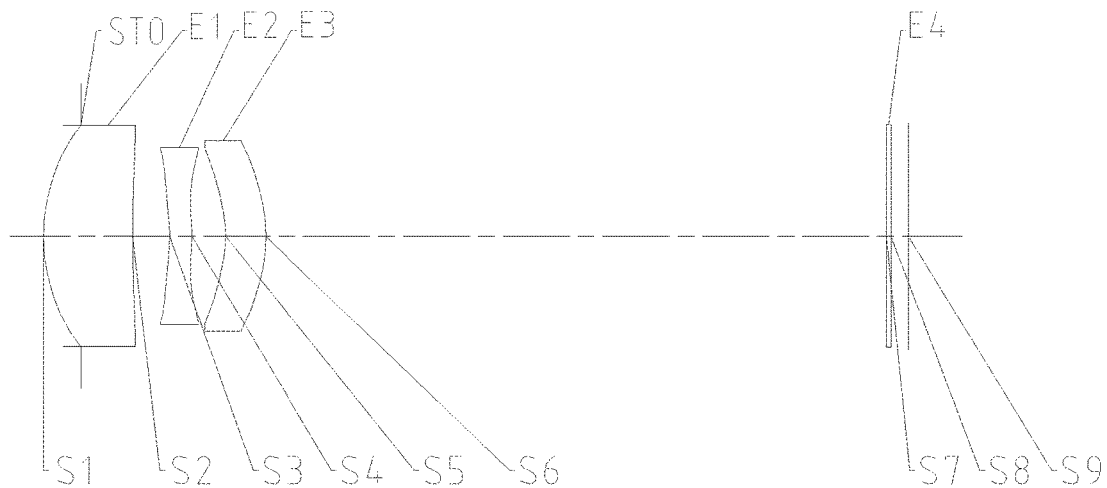
FIG. 8 shows a schematic structural diagram of the camera lens according to Embodiment 5 of the present application.

A camera lens according to Embodiment 5 of the present application will be described below with reference to FIGS. 8 to 9D. FIG. 8 shows a schematic structural diagram of the camera lens according to Embodiment 5 of the present application.

As shown in FIG. 8, the camera lens includes a diaphragm STO, a first lens E1, a second lens E2, a third lens E3, and a filter E4 in order from an object side to an image side along an optical axis.

The first lens E1 has a positive refractive power, and has a convex object side surface S1 and a concave image side surface S2. The second lens E2 has a negative refractive power, and has a concave object side surface S3 and a convex image side surface S4. The third lens E3 has a negative focal power, and has a concave object side surface S5 and a convex image side surface S6. The filter E4 has an object side surface S7 and an image side surface S8. The camera lens has an imaging plane S9. Light from an object sequentially passes through the respective surfaces S1 to S8 and finally forms an image on the imaging plane S9.

In Embodiment 5, a total effective focal length f of the camera lens has a value of mm, and an aperture number Fno of the camera lens has a value of 4.0.

Table 8 shows a table of basic parameters of the camera lens of Embodiment 5, wherein the units of the radius of curvature, thickness/distance, and focal length are all millimeters (mm). Table 9 shows higher-order coefficients of each aspherical lens surface that are applicable in Embodiment 5, wherein the surface shape of each aspherical surface can be defined by formula (1) given in Embodiment 1 described above.

TABLE 8

| Surface No. | Surface type | Radius of curvature | Thickness/ distance | Refractive index | Dispersion coefficient | Focal length | Conic coefficient |
| --- | --- | --- | --- | --- | --- | --- | --- |
| OBJ | Spherical | Infinity | Infinity | | | | |
| STO | Spherical | Infinity | −1.6733 | | | | |
| S1 | Aspherical | 8.4335 | 4.0000 | 1.546 | 56.09 | 18.01 | 0.0000 |
| S2 | Aspherical | 49.3446 | 1.6726 | | | | 0.0000 |
| S3 | Aspherical | −6.9518 | 1.0000 | 1.640 | 23.98 | −75.72 | 0.0000 |
| S4 | Aspherical | −8.5724 | 1.5206 | | | | 0.0000 |
| S5 | Aspherical | −5.4875 | 1.8068 | 1.677 | 19.24 | −48.68 | 0.0000 |
| S6 | Aspherical | −7.4590 | 27.9941 | | | | 0.0000 |
| S7 | Spherical | Infinity | 0.2100 | 1.518 | 64.17 | | |
| S8 | Spherical | Infinity | 0.7900 | | | | |
| S9 | Spherical | Infinity | | | | | |

TABLE 9

| Surface No. | A4 | A6 | A8 | A10 | A12 |
| --- | --- | --- | --- | --- | --- |
| S1 | 1.1215E−02 | 2.4839E−02 | −4.8088E−04 | −6.3988E−04 | 1.1058E−04 |
| S2 | −8.5113E−02 | 1.2489E−02 | −3.6210E−03 | −3.0421E−03 | 1.7216E−03 |
| S3 | 1.0237E+00 | −2.1970E−01 | 4.6823E−02 | −1.1070E−02 | 3.3763E−03 |
| S4 | 1.4585E+00 | −2.6142E−01 | 5.2122E−02 | −5.4306E−03 | −6.6916E−04 |
| S5 | 8.0558E−01 | −7.1917E−02 | 1.9530E−02 | −8.8084E−04 | −2.4877E−03 |
| S6 | 2.6081E−01 | −1.6927E−02 | 3.8721E−03 | 3.0227E−04 | −1.8026E−03 |

| Surface No. | A14 | A16 | A18 | A20 |
| --- | --- | --- | --- | --- |
| S1 | −5.5105E−06 | 1.0971E−07 | 0.0000E+00 | 0.0000E+00 |
| S2 | −2.9070E−04 | 1.6227E−05 | 0.0000E+00 | 0.0000E+00 |
| S3 | −6.8058E−04 | 6.0077E−05 | 3.7364E−07 | 0.0000E+00 |
| S4 | 2.8942E−04 | −2.6176E−05 | −9.4510E−08 | 0.0000E+00 |
| S5 | 1.1644E−03 | −1.3956E−04 | −2.8734E−06 | −8.5287E−08 |
| S6 | 1.0925E−03 | −2.8907E−04 | −8.9735E−06 | 0.0000E+00 |

Figures 9A, 9B:
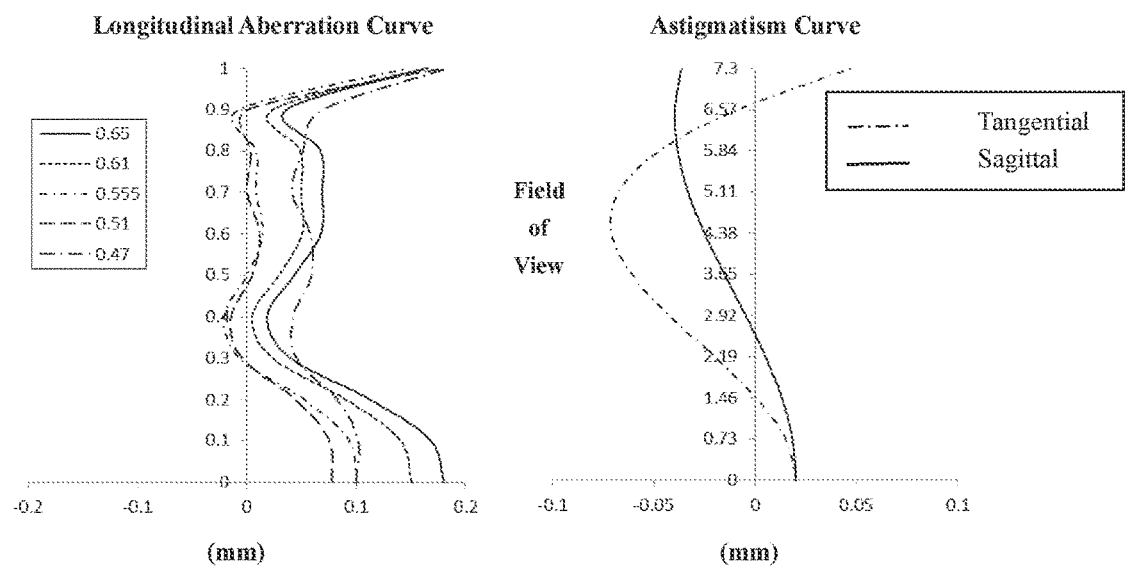
FIGS. 9A to 9D show a longitudinal aberration curve, astigmatism curve, distortion curve and lateral color curve of the camera lens according to Embodiment 5, respectively.
Figures 9C, 9D:
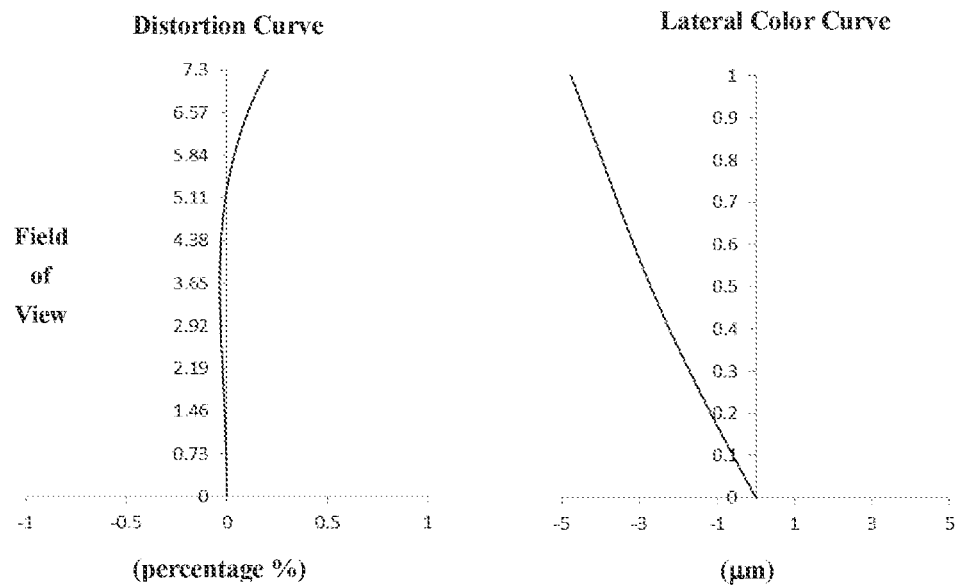

FIG. 9A shows a longitudinal aberration curve of the camera lens according to Embodiment 5, which represents the deviation of the converged focal point after light of different wavelengths passes through the lens. FIG. 9B shows an astigmatism curve of the camera lens according to Embodiment 5, which represents the curvature of the tangential image plane and the curvature of the sagittal image plane. FIG. 9C shows a distortion curve of the camera lens according to Embodiment 5, which represents distortion magnitude values corresponding to different image heights. FIG. 9D shows a lateral color curve of the camera lens according to Embodiment 5, which represents the deviation of different image heights on the imaging plane after light passes through the lens. According to FIGS. 9A to 9D, it can be seen that the camera lens given in Embodiment 5 can achieve good imaging quality.

Embodiment 6

Figure 10:
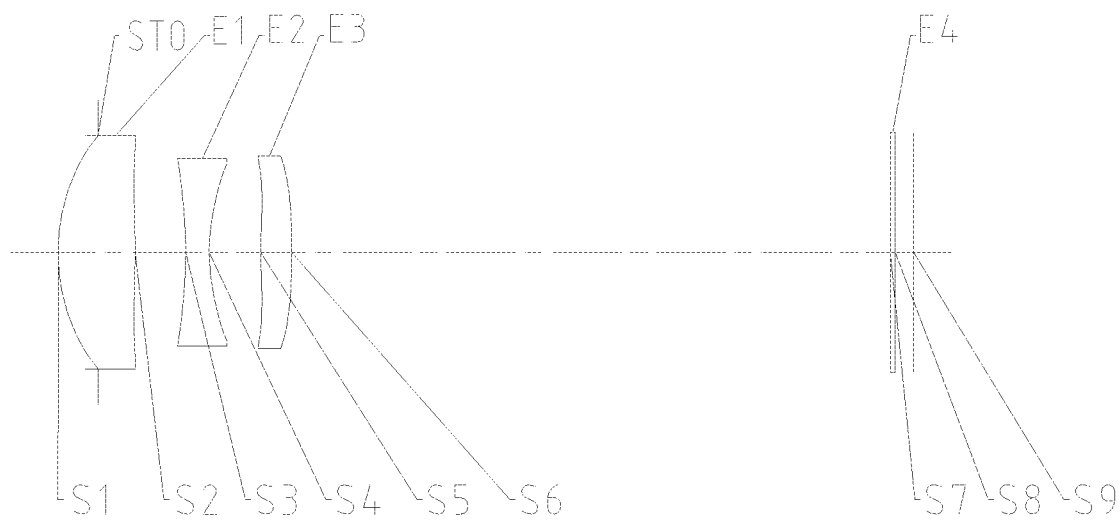
FIG. 10 shows a schematic structural diagram of the camera lens according to Embodiment 6 of the present application.

A camera lens according to Embodiment 6 of the present application will be described below with reference to FIGS. 10 to 11D. FIG. 10 shows a schematic structural diagram of the camera lens according to Embodiment 6 of the present application.

As shown in FIG. 10, the camera lens includes a diaphragm STO, a first lens E1, a second lens E2, a third lens E3, and a filter E4 in order from an object side to an image side along an optical axis.

The first lens E1 has a positive focal power, and has a convex object side surface S1 and a convex image side surface S2. The second lens E2 has a negative focal power, and has a concave object side surface S3 and a concave image side surface S4. The third lens E3 has a positive refractive power, and has a convex object side surface S5 and a concave image side surface S6. The filter E4 has an object side surface S7 and an image side surface S8. The camera lens has an imaging plane S9. Light from an object sequentially passes through the respective surfaces S1 to S8 and finally forms an image on the imaging plane S9.

In Embodiment 6, a total effective focal length f of the camera lens has a value of 40 mm, and an aperture number Fno of the camera lens has a value of 4.0.

Table 10 shows a table of basic parameters of the camera lens of Embodiment 6, wherein the units of the radius of curvature, thickness/distance, and focal length are all millimeters (mm). Table 11 shows higher-order coefficients of each aspherical lens surface that are applicable in Embodiment 6, wherein the surface shape of each aspherical surface can be defined by formula (1) given in Embodiment 1 described above.

TABLE 10

| Surface No. | Surface type | Radius of curvature | Thickness/ distance | Refractive index | Dispersion coefficient | Focal length | Conic coefficient |
|---|---|---|---|---|---|---|---|
| OBJ | Spherical | Infinity | Infinity | | | | |
| STO | Spherical | Infinity | −1.7102 | | | | |
| S1 | Aspherical | 8.8515 | 3.3006 | 1.546 | 56.09 | 13.27 | 0.0000 |
| S2 | Aspherical | −34.5994 | 2.1658 | | | | 0.0000 |
| S3 | Aspherical | −19.2451 | 1.0000 | 1.640 | 23.98 | −8.23 | 0.0000 |
| S4 | Aspherical | 7.3869 | 2.2088 | | | | 0.0000 |
| S5 | Aspherical | 14.5879 | 1.3248 | 1.677 | 19.24 | 21.91 | 0.0000 |
| S6 | Aspherical | 843.0330 | 25.6626 | | | | 0.0000 |
| S7 | Spherical | Infinity | 0.2100 | 1.518 | 64.17 | | |
| S8 | Spherical | Infinity | 0.7900 | | | | |
| S9 | Spherical | Infinity | | | | | |

TABLE 11

| Surface No. | A4 | A6 | A8 | A10 | A12 | A14 | A16 | A18 |
|---|---|---|---|---|---|---|---|---|
| S1 | 1.6134E−01 | 4.5611E−03 | 5.9780E−04 | 5.1901E−05 | 4.7549E−06 | 3.6989E−07 | 8.1482E−09 | 0.0000E+00 |
| S2 | 3.4894E−01 | −4.3873E−02 | 5.8942E−03 | −1.1302E−03 | 2.0999E−04 | −1.0475E−05 | 2.8289E−05 | 1.0327E−07 |
| S3 | 8.9997E−02 | −1.2766E−02 | 1.2524E−03 | −6.9217E−05 | 2.0995E−06 | −3.1554E−08 | 0.0000E+00 | 0.0000E+00 |
| S4 | −3.3915E−01 | 6.1837E−02 | −1.1035E−02 | 2.8314E−03 | −4.6765E−04 | 3.3171E−05 | −6.1360E−07 | 0.0000E+00 |
| S5 | −7.1323E−01 | 8.7066E−02 | −2.1459E−02 | 4.7730E−03 | −6.5679E−04 | 4.6539E−06 | 2.0922E−05 | 2.9515E−08 |
| S6 | −5.1784E−01 | 6.0090E−02 | −1.8706E−02 | 4.8848E−03 | −1.1126E−03 | 3.1628E−04 | −3.8309E−05 | −3.6172E−07 |

Figure 11A:
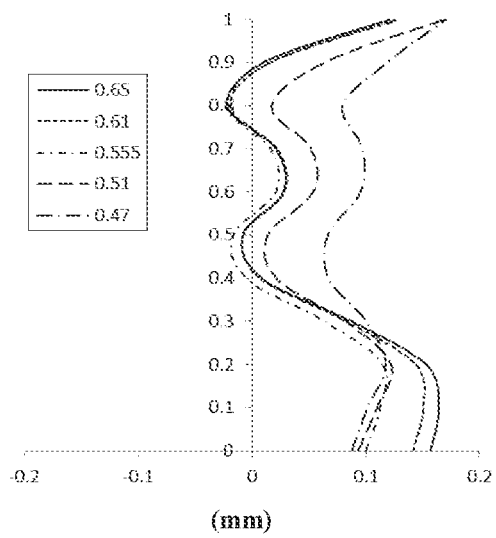
FIGS. 11A to 11D show a longitudinal aberration curve, astigmatism curve, distortion curve and lateral color curve of the camera lens according to Embodiment 6, respectively.
Figure 11B:
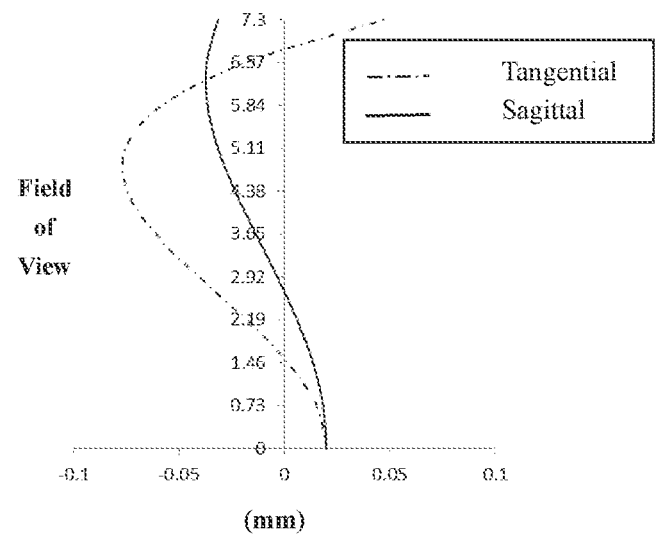
Figure 11C:
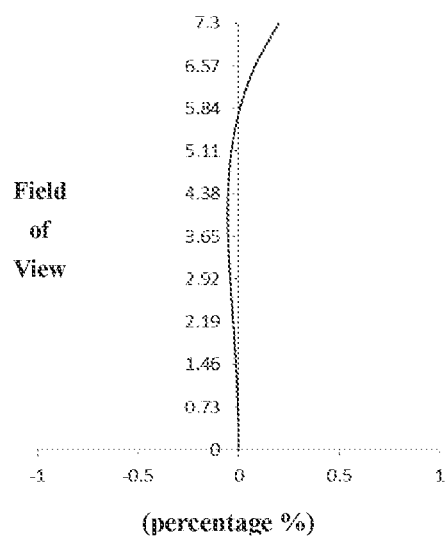
Figure 11D:
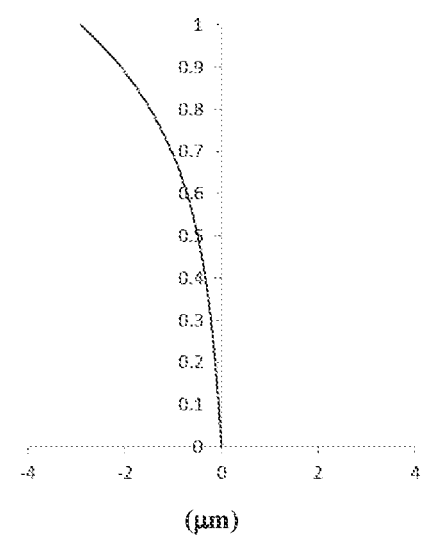

FIG. 11A shows a longitudinal aberration curve of the camera lens according to Embodiment 6, which represents the deviation of the converged focal point after light of different wavelengths passes through the lens. FIG. 11B shows an astigmatism curve of the camera lens according to Embodiment 6, which represents the curvature of the tangential image plane and the curvature of the sagittal image plane. FIG. 11C shows a distortion curve of the camera lens according to Embodiment 6, which represents distortion magnitude values corresponding to different image heights. FIG. 11D shows a lateral color curve of the camera lens according to Embodiment 6, which represents the deviation of different image heights on the imaging plane after light passes through the lens. According to FIGS. 11A to 11D, it can be seen that the camera lens given in Embodiment 6 can achieve good imaging quality.

Embodiment 7

Figure 12:
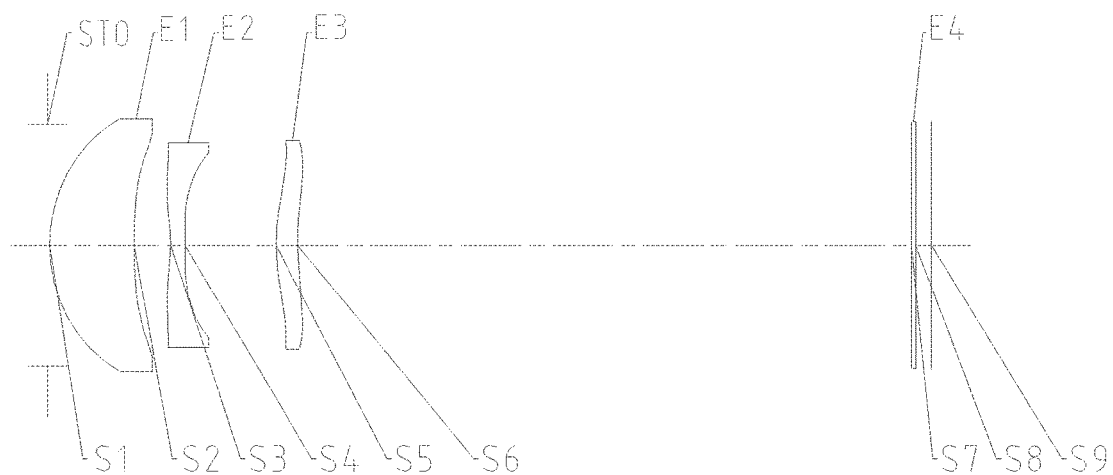
FIG. 12 shows a schematic structural diagram of the camera lens according to Embodiment 7 of the present application.

A camera lens according to Embodiment 7 of the present application will be described below with reference to FIGS. 12 to 13D. FIG. 12 shows a schematic structural diagram of the camera lens according to Embodiment 7 of the present application.

As shown in FIG. 12, the camera lens includes a diaphragm STO, a first lens E1, a second lens E2, a third lens E3, and a filter E4 in order from an object side to an image side along an optical axis.

The first lens E1 has a positive refractive power, and has a convex object side surface S1 and a concave image side surface S2. The second lens E2 has a negative refractive power, and has a concave object side surface S3 and a convex image side surface S4. The third lens E3 has a positive refractive power, and has a convex object side surface S5 and a concave image side surface S6. The filter E4 has an object side surface S7 and an image side surface S8. The camera lens has an imaging plane S9. Light from an object sequentially passes through the respective surfaces S1 to S8 and finally forms an image on the imaging plane S9.

In Embodiment 7, a total effective focal length f of the camera lens has a value of 48 mm, and an aperture number Fno of the camera lens has a value of 4.0.

Table 12 shows a table of basic parameters of the camera lens of Embodiment 7, wherein the units of the radius of curvature, thickness/distance, and focal length are all millimeters (mm). Table 13 shows higher-order coefficients of each aspherical lens surface that are applicable in Embodiment 7, wherein the surface shape of each aspherical surface can be defined by formula (1) given in Embodiment 1 described above.

TABLE 12

| Surface No. | Surface type | Radius of curvature | Thickness/ distance | Material Refractive index | Material Dispersion coefficient | Focal length | Conic coefficient |
|---|---|---|---|---|---|---|---|
| OBJ | Spherical | Infinity | Infinity | | | | |
| STO | Spherical | Infinity | 0.1000 | | | | |
| S1 | Aspherical | 7.8601 | 4.1709 | 1.546 | 56.09 | 17.39 | 0.0000 |
| S2 | Aspherical | 37.1265 | 1.8117 | | | | 0.0000 |
| S3 | Aspherical | −7.0002 | 0.7000 | 1.640 | 23.98 | −13.83 | 0.0000 |
| S4 | Aspherical | −34.8235 | 4.5087 | | | | 0.0000 |
| S5 | Aspherical | 10.7636 | 1.0862 | 1.677 | 19.24 | 46.21 | 0.0000 |
| S6 | Aspherical | 15.7411 | 30.4014 | | | | 0.0000 |
| S7 | Spherical | Infinity | 0.2100 | 1.518 | 64.17 | | |
| S8 | Spherical | Infinity | 0.7900 | | | | |
| S9 | Spherical | Infinity | | | | | |

TABLE 13

| Surface No. | A4 | A6 | A8 | A10 | A12 |
|---|---|---|---|---|---|
| S1 | 2.7787E−01 | 5.5461E−02 | 1.0012E−02 | 1.3209E−03 | −4.1686E−04 |
| S2 | 5.8716E−01 | −7.2216E−02 | −2.1311E−02 | −4.7211E−03 | −2.4749E−03 |
| S3 | 2.4135E+00 | −4.0409E−01 | 8.6674E−02 | −2.8215E−02 | 3.7508E−03 |
| S4 | 1.6331E+00 | −2.1660E−01 | 6.5134E−02 | −1.1077E−02 | 3.7239E−04 |
| S5 | −7.7495E−01 | −2.1429E−02 | 7.8044E−03 | −2.1807E−03 | −1.5128E−03 |
| S6 | −7.5768E−01 | −2.0843E−02 | 5.7227E−03 | −2.5905E−03 | −9.5045E−04 |

| Surface No. | A14 | A16 | A18 | A20 |
|---|---|---|---|---|
| S1 | −1.8160E−04 | 2.9813E−05 | 3.4610E−06 | 7.2736E−07 |
| S2 | 1.1441E−03 | 3.7636E−04 | 4.1700E−06 | 7.0954E−08 |
| S3 | −5.3530E−04 | 1.8186E−04 | −1.6892E−06 | 0.0000E+00 |
| S4 | 8.2162E−05 | −1.8374E−04 | −2.7660E−06 | −1.3443E−07 |
| S5 | 5.8166E−04 | 1.0981E−04 | −9.6615E−07 | 0.0000E+00 |
| S6 | 6.8160E−04 | 1.5504E−05 | −2.5848E−07 | 0.0000E+00 |

Figure 13A:
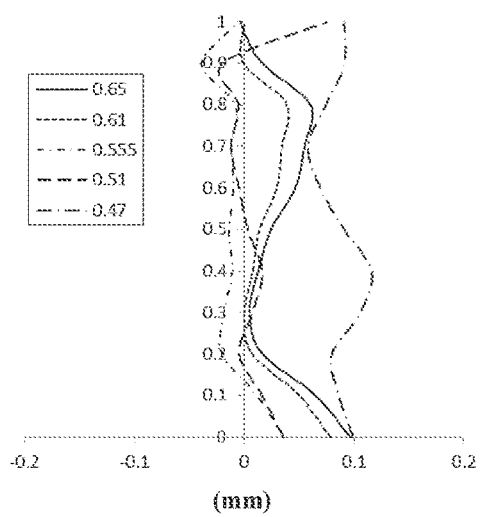
FIGS. 13A to 13D show a longitudinal aberration curve, astigmatism curve, distortion curve and lateral color curve of the camera lens according to Embodiment 7, respectively.
Figure 13B:
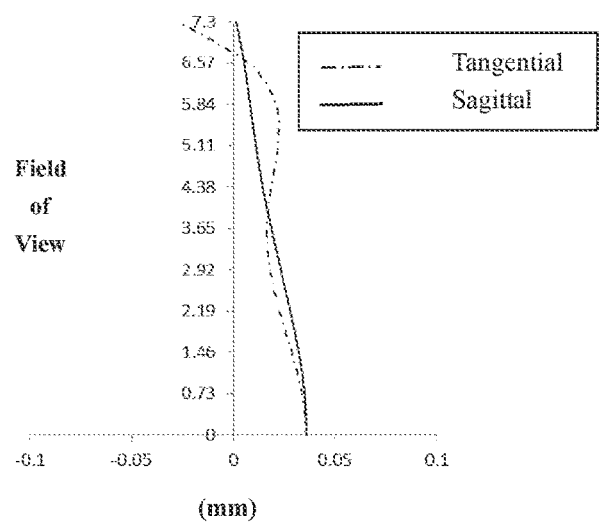
Figure 13C:
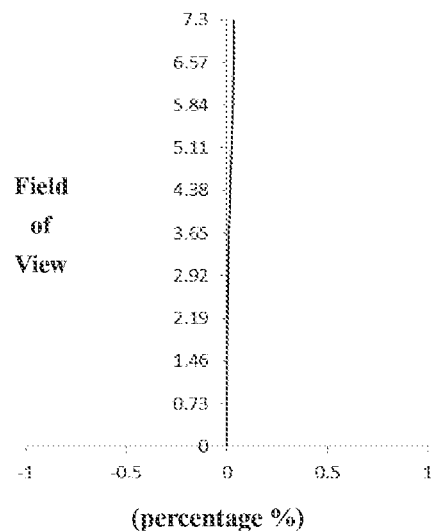
Figure 13D:
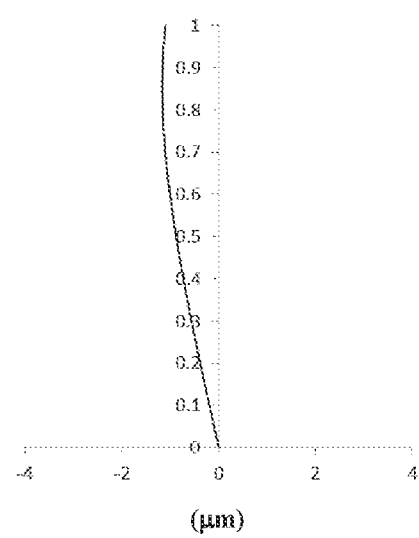

FIG. 13A shows a longitudinal aberration curve of the camera lens according to Embodiment 7, which represents the deviation of the converged focal point after light of different wavelengths passes through the lens. FIG. 13B shows an astigmatism curve of the camera lens according to Embodiment 7, which represents the curvature of the tangential image plane and the curvature of the sagittal image plane. FIG. 13C shows a distortion curve of the camera lens according to Embodiment 7, which represents distortion magnitude values corresponding to different image heights. FIG. 13D shows a lateral color curve of the camera lens according to Embodiment 7, which represents the deviation of different image heights on the imaging plane after light passes through the lens. According to FIGS. 13A to 13D, it can be seen that the camera lens given in Embodiment 7 can achieve good imaging quality.

Embodiment 8

Figure 14:
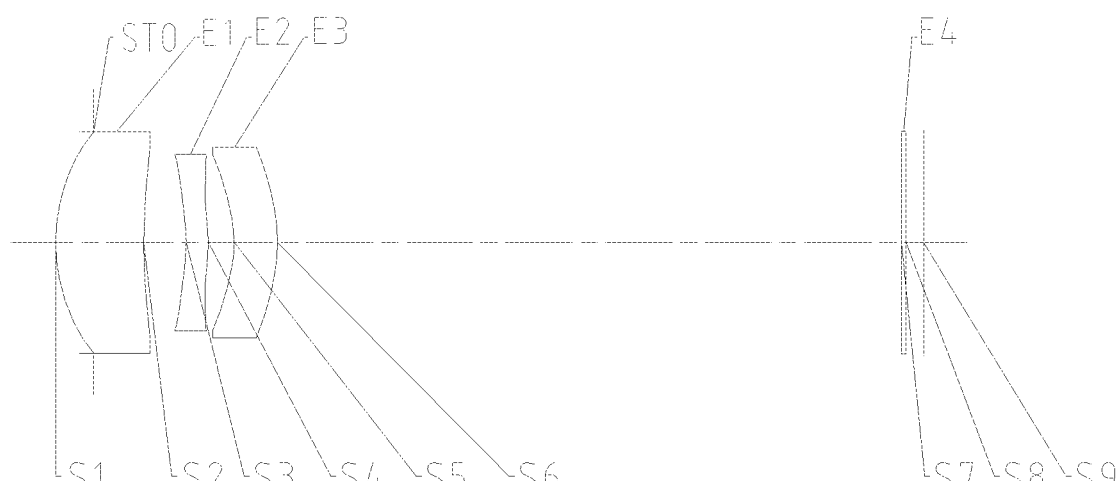
FIG. 14 shows a schematic structural diagram of the camera lens according to Embodiment 8 of the present application.

A camera lens according to Embodiment 8 of the present application will be described below with reference to FIGS. 14 to 15D. FIG. 14 shows a schematic structural diagram of the camera lens according to Embodiment 8 of the present application.

As shown in FIG. 14, the camera lens includes a diaphragm STO, a first lens E1, a second lens E2, a third lens E3, and a filter E4 in order from an object side to an image side along an optical axis.

The first lens E1 has a positive refractive power, and has a convex object side surface S1 and a concave image side surface S2. The second lens E2 has a positive refractive power, and has a concave object side surface S3 and a convex image side surface S4. The third lens E3 has a negative focal power, and has a concave object side surface S5 and a convex image side surface S6. The filter E4 has an object side surface S7 and an image side surface S8. The camera lens has an imaging plane S9. Light from an object sequentially passes through the respective surfaces S1 to S8 and finally forms an image on the imaging plane S9.

In Embodiment 8, a total effective focal length f of the camera lens has a value of 40 mm, and an aperture number Fno of the camera lens has a value of 4.0.

Table 14 shows a table of basic parameters of the camera lens of Embodiment 8, wherein the units of the radius of curvature, thickness/distance, and focal length are all millimeters (mm). Table 15 shows higher-order coefficients of each aspherical lens surface that are applicable in Embodiment 8, wherein the surface shape of each aspherical surface can be defined by formula (1) given in Embodiment 1 described above.

TABLE 14

| Surface No. | Surface type | Radius of curvature | Thickness/ distance | Refractive index | Dispersion coefficient | Focal length | Conic coefficient |
|---|---|---|---|---|---|---|---|
| OBJ | Spherical | Infinity | Infinity | | | | |
| STO | Spherical | Infinity | −1.7121 | | | | |
| S1 | Aspherical | 8.3469 | 3.9664 | 1.546 | 56.09 | 21.03 | 0.0000 |
| S2 | Aspherical | 25.4511 | 1.9238 | | | | 0.0000 |
| S3 | Aspherical | −6.8554 | 1.0000 | 1.640 | 23.98 | 72.44 | 0.0000 |
| S4 | Aspherical | −6.3116 | 1.1647 | | | | 0.0000 |
| S5 | Aspherical | −5.2483 | 1.9451 | 1.677 | 19.24 | −27.95 | 0.0000 |
| S6 | Aspherical | −8.3491 | 28.1554 | | | | 0.0000 |
| S7 | Spherical | Infinity | 0.2100 | 1.518 | 64.17 | | |
| S8 | Spherical | Infinity | 0.7900 | | | | |
| S9 | Spherical | Infinity | | | | | |

TABLE 15

| Surface No. | A4 | A6 | A8 | A10 | A12 |
|---|---|---|---|---|---|
| S1 | 2.9597E−02 | 2.4288E−02 | −9.1824E−04 | −3.9362E−04 | 7.6330E−05 |
| S2 | −9.2272E−02 | 1.3764E−02 | −6.8735E−03 | −1.9935E−03 | 1.5809E−03 |
| S3 | 9.1756E−01 | −1.7320E−01 | 3.1216E−02 | −6.1741E−03 | 2.7484E−03 |
| S4 | 1.4924E+00 | −2.3821E−01 | 4.6259E−02 | −2.9690E−03 | −9.5353E−04 |
| S5 | 9.0486E−01 | −8.8545E−02 | 2.7350E−02 | −2.6324E−03 | −2.2597E−03 |
| S6 | 2.5639E−01 | −1.5242E−02 | 4.9324E−03 | −4.4291E−04 | −1.3996E−03 |

| Surface No. | A14 | A16 | A18 | A20 |
|---|---|---|---|---|
| S1 | −3.3908E−06 | 9.7309E−08 | 0.0000E+00 | 0.0000E+00 |
| S2 | −2.7713E−04 | 1.5120E−05 | 2.0724E−08 | 0.0000E+00 |
| S3 | −8.8746E−04 | 1.0343E−04 | 9.4762E−07 | 0.0000E+00 |
| S4 | −5.4152E−05 | 7.7607E−05 | 1.0593E−08 | 0.0000E+00 |
| S5 | 1.2977E−03 | −1.6863E−04 | −3.7954E−06 | −1.0885E−07 |
| S6 | 1.1710E−03 | −3.5585E−04 | −8.2084E−06 | −2.8585E−07 |

FIG. 15A shows a longitudinal aberration curve of the camera lens according to Embodiment 8, which represents the deviation of the converged focal point after light of different wavelengths passes through the lens. FIG. 15B shows an astigmatism curve of the camera lens according to Embodiment 8, which represents the curvature of the tangential image plane and the curvature of the sagittal image plane. FIG. 15C shows a distortion curve of the camera lens according to Embodiment 8, which represents distortion magnitude values corresponding to different image heights. FIG. 15D shows a lateral color curve of the camera lens according to Embodiment 8, which represents the deviation of different image heights on the imaging plane after light passes through the lens. According to FIGS. 15A to 15D, it can be seen that the camera lens given in Embodiment 8 can achieve good imaging quality.

In summary. Embodiments 1 to 8 satisfy the relationships shown in Table 16, respectively.

TABLE 16

| Conditional expression\Embodiment | 1 | 2 | 3 | 4 | 5 | 6 | 7 | 8 |
|---|---|---|---|---|---|---|---|---|
| f × tan (Semi-FOV) | 5.12 | ← | 5.12 | 5.76 | 5.12 | 5.12 | 6.15 | 5.12 |
| TL/EPD | 3.71 | ← | 3.63 | 3.68 | 3.90 | 3.67 | 3.64 | 3.92 |
| f/f1 | 2.83 | ← | 2.68 | 2.71 | 2.22 | 3.02 | 2.76 | 1.90 |
| f/FL | 1.48 | ← | 1.52 | 1.53 | 1.38 | 1.50 | 1.53 | 1.37 |
| f/f2 + f/f3 | −2.57 | ← | −2.47 | −2.37 | −1.35 | −3.04 | −2.43 | −0.88 |
| (N2 + N3)/2 | 1.66 | ← | 1.66 | 1.66 | 1.66 | 1.66 | 1.66 | 1.66 |
| |V2−V3| | 4.74 | ← | 4.74 | 4.74 | 4.74 | 4.74 | 4.74 | 4.74 |
| R1/CT1 | 2.00 | ← | 2.23 | 1.90 | 2.11 | 2.68 | 1.88 | 2.10 |
| R5/R6 | 0.57 | ← | 0.59 | 0.68 | 0.74 | 0.02 | 0.68 | 0.63 |
| CT1/(CT2 + CT3) | 1.83 | ← | 1.54 | 2.46 | 1.43 | 1.42 | 2.34 | 1.35 |
| T12/CT2 | 1.69 | ← | 2.11 | 2.71 | 1.67 | 2.17 | 2.59 | 1.92 |

The present application further provides an imaging apparatus, which is provided with an electronic photosensitive element to image. The electronic photosensitive element may be a charge-coupled device (CCD) or a complementary metal oxide semiconductor element (CMOS). The imaging apparatus may be an independent imaging apparatus such as a digital camera, or may be an imaging module integrated in a mobile electronic device such as a mobile phone. The imaging apparatus is equipped with the camera lens described above.

The above description is only the preferred embodiments of the present application and the explanation of the applied technical principle. It should be understood by those skilled in the art that the scope of protection involved in the present application is not limited to technical solutions formed by specific combinations of the above technical features, and at the same time, should also cover other technical solutions formed by any combination of the above technical features or equivalent features thereof without departing from the concept of the present application. For example, the above features and (but not limited to) the technical features with similar functions disclosed in the present application are replaced with each other to form technical solutions.

What is claimed is:

1. A camera lens, comprising, in order from an object side to an image side along an optical axis:
   a first lens having a positive refractive power;
   a second lens having a positive refractive power or a negative refractive power, wherein the second lens a concave object side surface; and
   a third lens having a positive refractive power or a negative refractive power which is opposite to the refractive power of the second lens, wherein there are three lenses: the first lens, the second lens, and the third lens, between the object side and the image side;
   wherein an equivalent length TL of an actual propagation distance of a principal ray from an object side surface of the first lens to an imaging plane in the air and an entrance pupil diameter EPD of the camera lens satisfy: 3.5<TL/EPD<4.0;
   wherein a total effective focal length f of the camera lens satisfies: f≥40 mm;
   wherein the total effective focal length f of the camera lens and a maximum semi-field of view Semi-FOV of the camera lens satisfy: f×tan(Semi-FOV)>5.0.

2. The camera lens according to claim 1, wherein a total effective focal length f of the camera lens and an effective focal length f1 of the first lens satisfy: 1.5<f/f1<3.5.

3. The camera lens according to claim 1, wherein a total effective focal length f of the camera lens, an effective focal length f2 of the second lens, and an effective focal length f3 of the third lens satisfy: −3.1<f/f2+f/f3<0.

4. The camera lens according to claim 1, wherein a total effective focal length f of the camera lens and an equivalent length FL of an actual propagation distance of the principal ray from an image side surface of the third lens to the imaging plane in the air satisfy: 1.2<f/FL<1.6.

5. The camera lens according to claim 1, wherein a refractive index N2 of the second lens and a refractive index N3 of the third lens satisfy: 1.6<(N2+N3)/2<1.7.

6. The camera lens according to claim 1, wherein a dispersion coefficient V2 of the second lens and a dispersion coefficient V3 of the third lens satisfy: |V2−V3|<10.

7. The camera lens according to claim 1, wherein a radius of curvature R1 of the object side surface of the first lens and a center thickness CT1 of the first lens may satisfy: 1.5<R1/CT1<3.0.

8. The camera lens according to claim 1, wherein a radius of curvature R5 of an object side surface of the third lens and a radius of curvature R6 of an image side surface of the third lens may satisfy: 0<R5/R6<1.0.

9. The camera lens according to claim 1, wherein a center thickness CT1 of the first lens, a center thickness CT2 of the second lens, and a center thickness CT3 of the third lens may satisfy: 1.0<CT1/(CT2+CT3)<2.5.

10. The camera lens according to claim 1, wherein a separation distance T12 between the first lens and the second lens on the optical axis and a center thickness CT2 of the second lens may satisfy: 1.5<T12/CT2<3.0.

11. The camera lens according to claim 1, wherein the camera lens further comprises:
   at least one mirror, wherein the mirror is disposed in an object side direction of the first lens or an image side direction of the third lens, and a reflecting surface of the mirror is used to deflect the optical axis.

12. The camera lens according to claim 1, wherein at least one plastic lens is included in the first lens to the third lens; and at least one aspherical lens surface is included in the object side surface of the first lens to an image side surface of the third lens.

\* \* \* \* \*